United States Patent [19]

Fitzke et al.

[11] Patent Number: 4,793,845

[45] Date of Patent: Dec. 27, 1988

[54] METHOD FOR REMOVING A CULLET OF A CATHODE-RAY TUBE

[75] Inventors: Emil V. Fitzke, Lawrenceville; Michael A. Colacello; Jack F. Otto, both of Trenton, all of N.J.

[73] Assignee: RCA Licensing Corporation, Princeton, N.J.

[21] Appl. No.: 113,690

[22] Filed: Oct. 28, 1987

Related U.S. Application Data

[62] Division of Ser. No. 880,047, Jun. 30, 1986, Pat. No. 4,723,979.

[51] Int. Cl.$^4$ .............................................. C03B 9/46
[52] U.S. Cl. ........................................ 65/105; 65/35; 65/36; 65/56; 65/112
[58] Field of Search ................... 65/17, 35, 36, 42, 56, 65/59.1, 59.6, 105, 120, 112; 445/26, 29, 44

[56] References Cited

U.S. PATENT DOCUMENTS

| | | | |
|---|---|---|---|
| 3,961,929 | 6/1976 | Stockdale | 65/35 |
| 4,165,227 | 8/1979 | Nubani et al. | 65/56 |
| 4,373,944 | 2/1983 | Glick et al. | 65/35 |
| 4,574,008 | 3/1986 | Kobayashi | 65/155 |
| 4,589,902 | 5/1986 | Colacello et al. | 65/252 |

FOREIGN PATENT DOCUMENTS 653079 3/1979 U.S.S.R. .

Primary Examiner—Arthur Kellogg
Attorney, Agent, or Firm—E. M. Whitacre; D. H. Irlbeck; T. H. Magee

[57] ABSTRACT

A method for heat sealing an electron gun mount, having a glass stem, into a neck of a cathode-ray tube includes a mount socket for supporting the mount within the neck and a plurality of burners for applying heat to the outside of the neck proximate the stem. The neck softens, thins and then seals to the stem, causing excess neck material that is lower than the stem, known as cullet, to be cut off. Prior to applying heat, a sleeve is disposed around the mount socket within the neck adjacent to the cullet, with a clearance between the sleeve and both the socket and the neck. A vibrating coil is attached to the sleeve for vibrating the sleeve while applying heat to the outside of the neck.

6 Claims, 1 Drawing Sheet

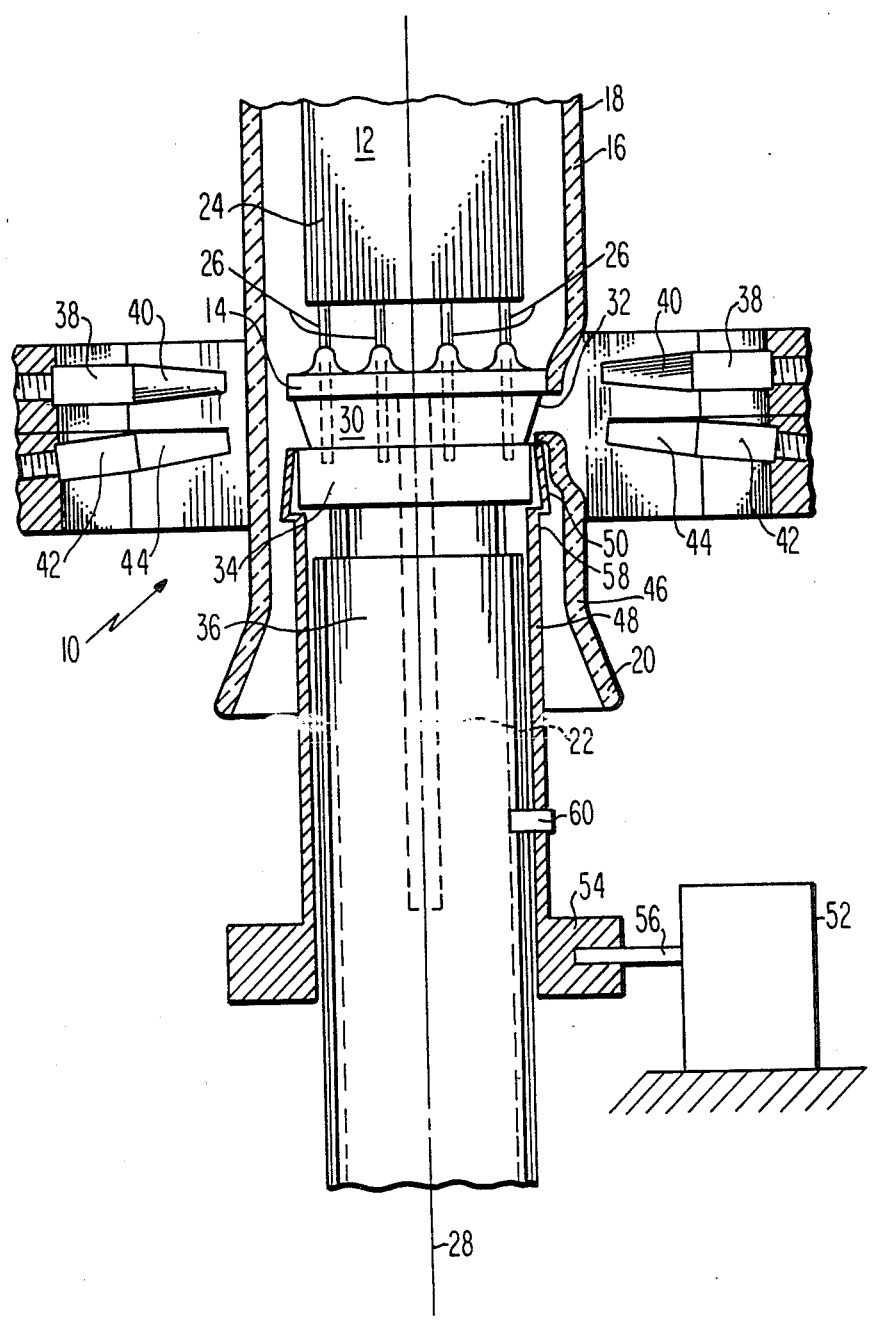

METHOD FOR REMOVING A CULLET OF A CATHODE-RAY TUBE

This is a division of application Ser. No. 880,047, filed June 30, 1986, now U.S. Pat. No. 4,723,979.

BACKGROUND OF THE INVENTION

This invention pertains to a method for heat sealing an electron gun mount, including a glass stem, into a neck of a cathode-ray tube and, in particular, a technique for removing the cullet during the heat-sealing process.

A standard cathode-ray tube (CRT) comprises a faceplate panel with a cathodoluminescent screen, a glass funnel having a protruding neck, and a mount containing an electron gun adapted to emit one or more beams of electrons for striking the screen. The mount includes a wafer-shaped glass stem on which the gun is mounted with lead wires for the gun electrodes projecting through the wafer. Round portions of glass called "fillets" surround the lead wires at the glass stem to provide a better seal around the lead wires. On the other side of the glass stem, opposite the gun, is an exhaust tubulation which extends away from the stem. The funnel typically is sealed to the faceplate panel in a high-temperature oven using a glass frit before the mount is sealed to the neck of the funnel. After the frit-sealing step, the mount is sealed to the glass neck by a heat-sealing apparatus which applies high-temperature flames to a localized area around the neck where the seal is to be formed.

During this mount-sealing process, the CRT is typically held in a vertical panel-up position by a cradle, and the mount is supported by a mount socket held in the top end of a spindle. The glass stem with the gun mounted thereon is upwardly inserted into the glass neck by the mount socket and spindle. The mount is aligned, so that the gun electrodes are aimed to properly strike the cathodoluminescent screen, and held thereat by the mount socket while heat from burners is applied to the outside of the neck proximate the stem. The burners are positioned around the vertical central axis of the CRT neck so that the neck softens, thins and then seals to the stem. Also, excess neck material that is lower than the stem is cut off and falls away from the neck as cullet. A two-tiered burner apparatus utilized for heat sealing an electron gun mount into a neck of a stationary cathode-ray tube is described in U.S. Pat. No. 4,589,902 issued to Colacello et al. on May 20, 1986.

In the process of sealing the mount into the neck of the CRT, the neck glass is melted and collapses against the glass stem on which the electron gun is mounted. Continued heating causes the molten neck glass to flow into the stem to form a seal and gravity causes the excess neck glass, or cullet, to fall away from the seal, as it is cut off, and onto the mount socket where it is allowed to cool. The molten cullet contracts as it cools, and the molten edge solidifies and adheres to and around the mount socket. This cullet must either be cracked off the mount socket which produces contaminating glass particles, or be reheated and then removed, as described in U.S Pat. No. 4,165,227 issued to Nubani et al. on Aug. 21, 1979. Cracking the cullet off the socket produces glass debris which can enter the tube and produce blocked aperture scrap, or arcing in the electron gun region of the tube. Remelting the cullet requires extra heating and cooling processing steps. The present invention provides a method and apparatus for cullet removal which is significantly more effective than the above-mentioned techniques.

SUMMARY OF THE INVENTION

A method for heat sealing an electron gun mount, having a glass stem, into a neck of a cathode-ray tube includes a mount socket for supporting the mount within the neck and a plurality of burners for applying heat to the outside of the neck proximate the stem. The neck softens, thins and then seals to the stem, causing excess neck material that is lower than the stem, known as cullet, to be cut off. Prior to applying heat, a sleeve is disposed around the mount socket within the neck adjacent to the cullet, with a clearance between the sleeve and both the socket and the neck. A vibrating coil is attached to the sleeve for vibrating the sleeve while applying heat to the outside of the neck.

BRIEF DESCRIPTION OF THE DRAWING

The drawing is a partial cross-sectional view illustrating an apparatus utilized to perform the present cullet-removal method.

DETAILED DESCRIPTION OF THE PREFERRED EMBODIMENT

The drawing shows an apparatus 10 for heat sealing an electron gun mount 12, including a glass stem 14, into a neck 16 of a cathode-ray tube (CRT) 18 which is flared at the end 20 thereof. The mount 12 includes an exhaust tubulation 22 integrally connected to the opposite side of the glass stem 14 upon which an electron gun 24 is mounted with lead wires 26. The CRT is oriented in a panel-up position along a vertical longitudinal axis 28, and held thereat by a stationary cradle (not shown). The mount 12 is supported by a mount socket 30 into which the ends of the lead wires 26 are inserted. The mount socket 30 comprises a cone-shpped stem circle 32 disposed on top of a cylindrical base 34. The mount socket 30 is made of a refractory material and is held in the top end of a spindle 36 that extends downward beyond the end of the CRT neck 16.

The drawing also shows means for applying heat to the outside of the neck 16 proximate the glass stem 14, so that the neck 16 softens, thins and then seals to the stem 44. In the present embodiment, the heat-applying means comprises a first tier 38 of burner tips 40 disposed completely around the neck 16 at a first distance therefrom and similarly aimed nonradially along directions tangent to a first circle. A second tier 42 of burner tips 44 is disposed completely around the neck 16 below the first tier 38 at a second distance from the neck 16. The burner tips 44 are aimed nonradially along directions tangent to a second circle. Such a two-tiered burner apparatus is further described in U.S. Pat. No. 4,589,902.

Flames from the first tier 38 rotate around the neck 16 in a vertical pattern and provide an even temperature distribution, so that uniform heating of the neck 16 results. The neck 16 softens due to the hot gases and "necks in" by becoming thinner and moving toward the glass stem 14. Excess neck material that is lower than the stem 14 begins to drop as cullet 46. The second tier 42 of burner tips 44 provides a temperature at the neck above 975° C. (the melting point of the neck and stem glass) so that the cullet is quickly cut off. Surface tension draws the thinned neck 16 up and around the bottom edges of the glass stem 14. The second tier 42 also causes the neck glass and the stem glass to flow together, thereby sealing the neck 16 to the stem 14.

In accordance with the present invention, a cylindrical sleeve 48 is disposed around the mount socket 30 within the neck 16 adjacent to the cullet 46, as shown in the drawing. The sleeve 48 is relatively thin, and preferably made of a material with high thermal conductivity, such as nickel or a beryllium-nickel alloy. There is a clearance between the sleeve 48 and both the mount socket 30 and the neck 16, in order to allow for vibrating movement. Preferably, this clearance is at least 0.1 millimeter. The top portion 50 of the sleve 48 is positioned below the cone-shaped stem circle 32 adjacent to the base 34, as shown in the drawing.

The sleev 48 extends around the spindle 36 and beyond the end 20 of the neck 16, whereat vibrating means is attached thereto. The vibrating means may comprise a 60 Hz vibrating coil 52, powered by 110 volt AC or a convenient variable source of oscillating voltage, which is attached to an enlarged bottom portion 54 of the sleeve 48 by an engaging rod 56. Preferably, the sleeve has indentation means positioned opposite the bottom of the cylindrical base 34 for preventing the top portion 50 of the sleeve 48 from moving above the base 34. In the present embodiment, this indentation means comprises a recessed clearance 58, which also allows the cullet 46 to drop freely where there is limited space between the inner diameter of the neck 16 and the mount socket 30. The sleeve 48 is supported by a set screw 60, attached to the spindle 36, with a clearance to permit floating on the spindle 36 and mount socket 30.

The top portion 50 of the sleeve 48 is tapered toward the glass stem 14, as shown in the drawing. In the present example, the taper of the sleeve 48 is approximately one degree with respect to the longitudinal axis 28 of the cathode-ray tube 18. Such a taper causes the cullet 46 to increase its inner diameter, and also to lift upward simultaneously while it cools and contracts, as explained further below.

In operation prior to the heat-applying step, the sleeve 48 is positioned around the mount socket 30 within the neck 16 adjacent to the cullet 46. There should be sufficient clearance between the sleeve 48 and both the socket 30 and neck 16 to allow the sleeve 48 to vibrate freely. During the heat-applying step, the sleeve 48 is vibrated by the vibrating coil 52. After cut-off, the cullet 46 drops onto the top portion 50 of the sleeve 48 and, due to vibration and heat from the second tier 42, settles downward along the tapered surface of the sleeve 48, thereby increasing the inner diameter of the cullet 46. It has been demonstrated that dropping the cullet 46 onto a vibrating sleeve 48 causes the molten edge of the cullet 46 to bloom outward into a flare, away from the mount socket 30. As the cullet 46 flows downward and becomes trapped on the tapered top portion 50 of the vibrating sleeve 48, the vibrating motion simultaneously lifts the solidifying glass upward as it cools and contracts. When the seal is complete, the cullet 46 will cool and can then be lifted easily over the stem circle 32 and removed from the mount socket 30 by a cullet remover. It has also been shown that fabricating the sleeve 48 from a material with high thermal conductivity improves the abovementioned performance.

In the preferred embodiment, is the sleeve 48 is tapered in order to push the cullet 46 out further and increase its inner diameter, so that it clears the stem circle 32 when it is lifted over the mount socket 30. The present invention thereby provides for effective cullet removal without producing glass debris or requiring reheating of the cullet.

What is claimed is:

1. In a method for sealing a mount having a glass stem in a neck of a cathode-ray tube including supporting said mount on a mount socket within said neck and applying heat to the outside of said neck proximate said stem so that said neck softens, thins and then seals to said stem, whereby excess neck material that is lower than said stem, known as cullet, is cut off and falls away from said neck, the improvement comprising the steps of:

positioning a sleeve around said mount socket within the space defined by said neck adjacent said cullet with a clearance between said sleeve and said socket, prior to said heat-applying step, and
   vibrating said sleeve during said heat-applying step.

2. A method as recited in claim 1 wherein a top portion of said sleeve is tapered toward said glass stem.

3. A method as recited in claim 2 wherein the taper of said sleeve is approximately one degree with respect to the longitudinal axis of said cathode-ray tube.

4. A method as recited in claim 1 wherein said mount socket comprises a cone-shaped stem circle disposed on top of a cylindrical base, and wherein the top portion of said sleeve is positioned below said stem circle adjacent to said base.

5. A method as defined in claim 1 wherein the clearance for said sleeve is at least 0.1 millimeter.

6. A method as recited in claim 1 wherein said vibrating step is performed by attaching a vibrating coil to said sleeve.

* * * * *